United States Patent
Patterson

(10) Patent No.: US 11,138,819 B1
(45) Date of Patent: Oct. 5, 2021

(54) MOBILE DEVICE COVERING DEVICE

(71) Applicant: James Patterson, Minocqua, WI (US)

(72) Inventor: James Patterson, Minocqua, WI (US)

( * ) Notice: Subject to any disclaimer, the term of this patent is extended or adjusted under 35 U.S.C. 154(b) by 0 days.

(21) Appl. No.: 16/932,172

(22) Filed: Jul. 17, 2020

(51) Int. Cl.
*G07C 9/00* (2020.01)
*H04B 1/3888* (2015.01)
*B60R 25/25* (2013.01)
*B60R 25/24* (2013.01)

(52) U.S. Cl.
CPC .......... *G07C 9/00309* (2013.01); *B60R 25/24* (2013.01); *B60R 25/25* (2013.01); *G07C 9/00563* (2013.01); *H04B 1/3888* (2013.01); *B60R 2325/205* (2013.01)

(58) Field of Classification Search
None
See application file for complete search history.

(56) References Cited

U.S. PATENT DOCUMENTS

| | | | | |
|---|---|---|---|---|
| 5,377,270 | A * | 12/1994 | Koopman, Jr. ........... | H04L 9/12 340/5.26 |
| 8,768,565 | B2 * | 7/2014 | Jefferies ............. | G07C 9/00571 701/32.7 |
| 2003/0231131 | A1 * | 12/2003 | Dimig ................. | G07C 9/00944 341/176 |
| 2005/0033689 | A1 * | 2/2005 | Bonalle .................. | G06Q 20/20 705/40 |
| 2015/0071509 | A1 * | 3/2015 | Myers .................. | G06K 9/0002 382/124 |
| 2015/0102900 | A1 * | 4/2015 | Ramchandani ........ | G08C 17/02 340/5.25 |
| 2016/0218765 | A1 * | 7/2016 | Meyer .................. | H04B 1/3888 |
| 2016/0300417 | A1 * | 10/2016 | Hatton ............... | G07C 9/00857 |
| 2016/0371907 | A1 * | 12/2016 | Ma .......................... | E05B 17/10 |
| 2017/0236344 | A1 * | 8/2017 | Murar ...................... | G07C 9/20 340/5.61 |
| 2017/0237945 | A1 * | 8/2017 | Murar .................... | H04N 7/183 348/148 |
| 2018/0105137 | A1 * | 4/2018 | Kawamura ........... | B60R 25/246 |
| 2018/0302788 | A1 * | 10/2018 | Konchan ............ | G07C 9/00944 |
| 2020/0307555 | A1 * | 10/2020 | Van Wiemeersch .. | B60W 30/06 |
| 2020/0374385 | A1 * | 11/2020 | Kang .................. | H04M 1/7246 |

* cited by examiner

*Primary Examiner* — Carlos Garcia
(74) *Attorney, Agent, or Firm* — The Iwashko Law Firm, PLLC; Lev Ivan Gabriel Iwashko

(57) ABSTRACT

A mobile device covering device, including a main body to receive a mobile device therein, and a key unit disposed on at least a portion of the main body to facilitate access to a vehicle and receive input to operate functions of the vehicle.

5 Claims, 1 Drawing Sheet

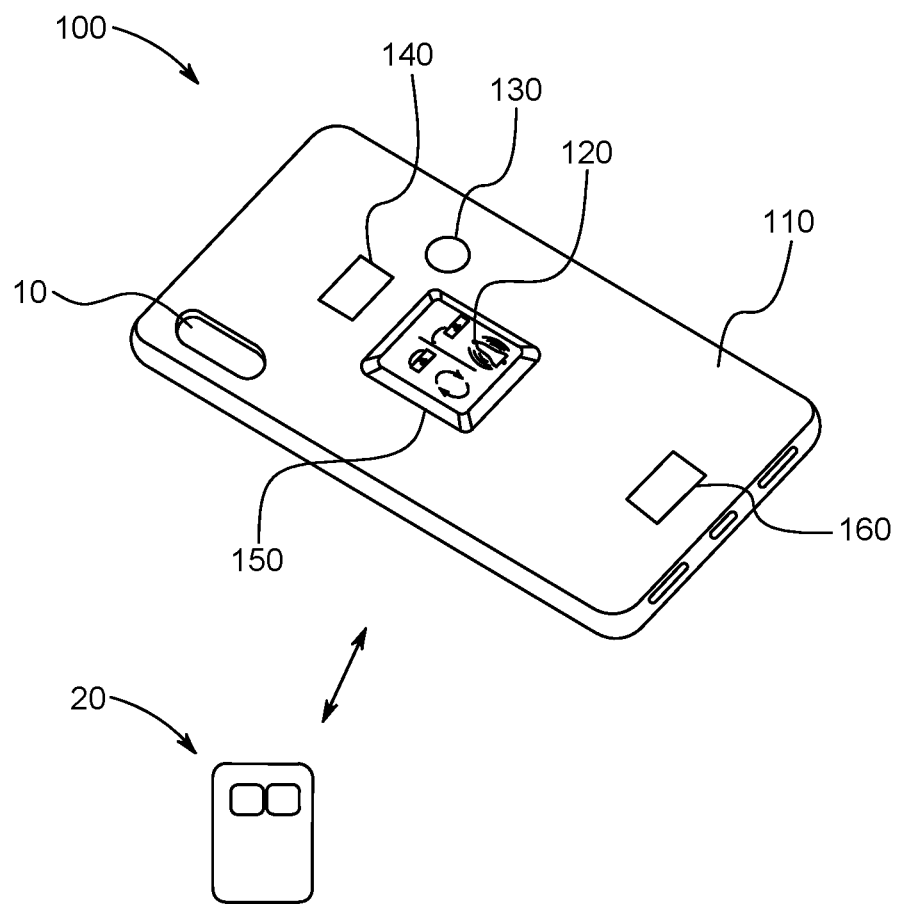

MOBILE DEVICE COVERING DEVICE

BACKGROUND

1. Field

The present general inventive concept relates generally to a covering device, and particularly, to a mobile device covering device.

2. Description of the Related Art

Many vehicle manufacturers develop vehicles with keyless entry mechanisms. Specifically, these vehicles often use a key fob that can use wireless technology, such as radio frequency identification (RFID) to communicate with an associated vehicle. Moreover, the key fob includes functionality to control the associated vehicle. Also, the key fob does not require insertion of a key into a key lock of a vehicle to start the vehicle, and instead, uses a push button.

However, the key fob is frequently forgotten, lost, and/or misplaced by a vehicle owner. Without the key fob, the vehicle owner cannot operate the vehicle at all.

Therefore, there is a need for a substitute device the vehicle owner frequently uses that performs similar functions as the key fob, such as a mobile device covering device.

SUMMARY

The present general inventive concept provides a mobile device covering device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a mobile device covering device, including a main body to receive a mobile device therein, and a key unit disposed on at least a portion of the main body to facilitate access to a vehicle and receive input to operate functions of the vehicle.

The key unit may be synchronized to a key fob of the vehicle prior to usage.

The key unit may include a vehicle lock button to lock the vehicle in response to being depressed, a vehicle unlock button to unlock the vehicle in response to being depressed, a vehicle power button to turn on or turn off the vehicle in response to being depressed, and a vehicle alarm button to turn on or turn off an alarm of the vehicle in response to being depressed.

The mobile device covering device may further include a biometric pressure sensor disposed under the key unit to receive at least one of a biometric reading and a pressure reading on the key unit to determine whether a user is at least one authorized user of the vehicle.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a rear perspective view of a mobile device covering device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

List of Components
Mobile Device Covering Device 100
Main Body 110
Key Unit 120
Communication Unit 130
Storage Unit 140
Biometric Pressure Sensor 150
Power Source 160

FIG. 1 illustrates a rear perspective view of a mobile device covering device, according to an exemplary embodiment of the present general inventive concept.

The mobile device covering device 100 may be constructed from at least one of metal, plastic, and rubber, etc., but is not limited thereto.

The mobile device covering device 100 may include a main body 110, a key unit 120, a communication unit 130, a storage unit 140, a biometric pressure sensor 150, and a power source 160, but is not limited thereto.

The main body 110 may be removably disposed on at least a portion of a mobile device 10. In other words, the main body 110 may receive the mobile device 10 therein to cover the mobile device 10.

Although, the main body 110 is illustrated to be a phone case, the main body 110 may be at least one of a tablet case, a laptop case, a personal digital assistant (PDA) case, a watch case, an electronic reader case, and a handheld gaming device case, etc., but is not limited thereto.

The key unit 120 may include a keyboard, a touchpad, a mouse, a trackball, a stylus, a voice recognition unit, a visual data reader, a camera, a wireless device reader, and a holographic key unit, but is not limited thereto.

Referring again to FIG. 1, the key unit 120 may also include a vehicle lock button, a vehicle unlock button, a vehicle power button, and a vehicle alarm button, but is not limited thereto.

The key unit 120 may be disposed on at least a portion of at a center portion of a rear surface of the main body 110.

The communication unit 130 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 140 may include a random access memory (RAM), a read-only memory (ROM), a hard disk, a flash drive, a database connected to the Internet, cloud-based storage, Internet-based storage, or any other type of storage unit.

Prior to usage, the key unit 120 may be preprogrammed by a user to be associated with a key fob 20 of a vehicle. More specifically, at least one button of the key unit 120 may be depressed for a predetermined duration of time and/or a predetermined number of times to activate a synchronization function, such that the communication unit 130 receives an identification code (e.g., RFID) of the key fob 20. Subsequent to synchronization, the key unit 120 may perform all functions similar to the key fob 20.

Additionally, the communication unit 130 may transmit the identification code to the storage unit 140, such that the key unit 120 may perform operations similar to the key fob 20. Furthermore, the key unit 120 and/or the communication unit 130 may transmit the identification code of the key fob 20, such that the key unit 120 and/or the communication 130 may facilitate access to the vehicle, similar to the key fob 20. In other words, the key unit 120 and/or the communication unit 130 may provide keyless entry to the vehicle and/or perform other commands.

The key unit 120 may receive different input commands from the user. For example, the key unit 120 may unlock the vehicle in response to the vehicle unlock button being depressed, lock the vehicle in response to the vehicle lock button being depressed, turn on and/or turn off the vehicle in response to the vehicle power button being depressed, and/or turn on and/or turn off an alarm of the vehicle in response to the vehicle alarm button being depressed.

The biometric pressure sensor 150 may include a fingerprint scanner, a face recognition scanner, an iris scanner, a voice recognition scanner, and a pressure sensor, but is not limited thereto.

The biometric pressure sensor 150 may be disposed within at least a portion of the main body 110 under the key unit 120. The biometric pressure sensor 150 may receive (i.e. detect and/or scan) a fingerprint, a face, an iris, a voice, and/or a pressure applied thereupon. Specifically, the biometric pressure sensor 150 may require scanning of the fingerprint, the face, the iris, and/or the voice of the user on and/or near the key unit 120 to determine whether the user is at least one authorized user of the vehicle before additional functions are enabled. Also, the biometric pressure sensor 150 may require the user apply a pressure on the key unit 120 equivalent to a predetermined pressure level received during preprogramming. Additional users that are authorized to use the vehicle may be included during the preprogramming.

As such, before the key unit 120 is enabled, the biometric pressure sensor 150 may require a biometric reading and a pressure reading that indicates the user is at least one of the authorized users. In other words, the biometric pressure sensor 150 may prevent an unauthorized user from access to the vehicle.

The power source 160 may include a battery and a solar cell, but is not limited thereto. Alternatively, the power source 160 may be an electrical connection connected to the mobile device 10, such that the power source 160 receives power from the mobile device 10.

Additionally, the battery may include lithium-ion, nickel cadmium, nickel metal hydride, alkaline, etc., but is not limited thereto. As such, the power source 160 may charge in response to exposure to a light source and/or receiving external power from a power outlet.

The power source 160 may send power to the key unit 120, the communication unit 130, the storage unit 140, and/or the biometric pressure sensor 150.

Therefore, the mobile device covering device 100 may be used to operate the vehicle of the user. In particular, the mobile device covering device 100 may facilitate use of the vehicle without need of and/or in the alternative to use of the key fob 20.

The present general inventive concept may include a mobile device covering device 100, including a main body 110 to receive a mobile device 10 therein, and a key unit 120 disposed on at least a portion of the main body 110 to facilitate access to a vehicle and receive input to operate functions of the vehicle.

The key unit 120 may be synchronized to a key fob 20 of the vehicle prior to usage.

The key unit 120 may include a vehicle lock button to lock the vehicle in response to being depressed, a vehicle unlock button to unlock the vehicle in response to being depressed, a vehicle power button to turn on or turn off the vehicle in response to being depressed, and a vehicle alarm button to turn on or turn off an alarm of the vehicle in response to being depressed.

The mobile device covering device 100 may further include a biometric pressure sensor 150 disposed under the key unit 120 to receive at least one of a biometric reading and a pressure reading on the key unit 120 to determine whether a user is at least one authorized user of the vehicle.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A mobile device covering device, comprising:
    a main body to receive a mobile phone therein to removably cover at least a portion of a rear surface of the mobile phone, such that the main body exposes at least a portion of the rear surface of the mobile phone through an oval shaped aperture while the main body covers the mobile phone; and
    a key unit disposed on at least a portion of the main body to facilitate access to a vehicle and receive input to operate functions of the vehicle, such that the key unit operates functions of the vehicle in absence of the mobile phone, the key unit comprising:
        a vehicle lock button to lock the vehicle in response to being depressed;
        a vehicle unlock button to unlock the vehicle in response to being depressed;
        a vehicle power button to turn on or turn off the vehicle in response to being depressed; and
        a vehicle alarm button to turn on or turn off an alarm of the vehicle in response to being depressed.

2. The mobile device covering device of claim 1, wherein the key unit is synchronized to a key fob of the vehicle prior to usage.

3. The mobile device covering device of claim 1, further comprising:
    a biometric pressure sensor disposed under the key unit to receive at least one of a biometric reading and a pressure reading on the key unit to determine whether a user is at least one authorized user of the vehicle.

4. A mobile device covering device, comprising:
    a main body removably disposed on at least a portion of a rear surface of a mobile device to cover the mobile device; and
    a key unit disposed on at least a portion of a center portion of a rear surface of the main body to facilitate access to a vehicle and receive input to operate functions of the vehicle, such that the key unit synchronizes to a key fob using RFID in response to depressing the key unit for a predetermined duration of time, such that the key unit operates functions of the vehicle in absence of the mobile phone.

5. A mobile device covering device, comprising:
    a main body to receive a mobile phone therein to removably cover at least a portion of a rear surface of the mobile phone, such that the main body exposes at least a portion of the rear surface of the mobile phone through an oval shaped aperture while the main body covers the mobile phone;
    a key unit disposed on at least a portion of the main body to facilitate access to a vehicle and receive input to operate functions of the vehicle, such that the key unit operates functions of the vehicle in absence of the mobile phone; and
    a biometric pressure sensor disposed under the key unit to receive at least one of a biometric reading and a pressure reading on the key unit to determine whether a user is at least one authorized user of the vehicle.

* * * * *